United States Patent
Brodsky et al.

(10) Patent No.: US 7,835,955 B1
(45) Date of Patent: Nov. 16, 2010

(54) TIME AND/OR ATTENDANCE SYSTEM USING SYNCHRONIZED CODE

(75) Inventors: Bert E. Brodsky, Sands Point, NY (US); Philip J. Passantino, New York, NY (US); Gary Stoller, Roslyn Heights, NY (US); Kenneth D. Faltischek, Port Washington, NY (US)

(73) Assignee: Sandata Technologies, Inc., Port Washington, NY (US)

( * ) Notice: Subject to any disclaimer, the term of this patent is extended or adjusted under 35 U.S.C. 154(b) by 0 days.

(21) Appl. No.: 12/605,921

(22) Filed: Oct. 26, 2009

Related U.S. Application Data

(60) Provisional application No. 61/227,243, filed on Jul. 21, 2009.

(51) Int. Cl.
*G06F 15/02* (2006.01)
*G07C 1/10* (2006.01)

(52) U.S. Cl. ............... 705/32; 235/377; 455/404.2
(58) Field of Classification Search ............ None
See application file for complete search history.

(56) References Cited

U.S. PATENT DOCUMENTS

| | | | |
|---|---|---|---|
| 5,646,839 A | 7/1997 | Katz | |
| 6,591,242 B1 | 7/2003 | Karp et al. | |
| 7,004,389 B1 * | 2/2006 | Robinson et al. | 235/382 |
| 7,427,033 B1 * | 9/2008 | Roskind | 235/492 |
| 7,477,154 B2 | 1/2009 | Braunstein | |
| 7,664,481 B2 * | 2/2010 | Braunstein | 455/404.2 |
| 2003/0177374 A1 * | 9/2003 | Yung et al. | 713/189 |
| 2005/0021982 A1 | 1/2005 | Popp et al. | |
| 2007/0145113 A1 * | 6/2007 | Keller et al. | 235/377 |
| 2007/0207773 A1 | 9/2007 | Braunstein | |
| 2009/0100509 A1 | 4/2009 | Wolfsberger | |

* cited by examiner

*Primary Examiner*—F. Zeender
*Assistant Examiner*—Luna Champagne
(74) *Attorney, Agent, or Firm*—George H. Gerstman; Seyfarth Shaw LLP

(57) ABSTRACT

A time and/or attendance system is provided which includes a service location. The service location has a server with a first periodically changing random code that is correlated with actual time. A device displaying a second periodically changing random code is located at a selected location. The second periodically changing random code has the same sequence as the first periodically changing random code but the code being displayed on the device is offset in time from the first periodically changing random code. An employee who is expected to provide services at the selected location notes the second periodically changing random code at the beginning of an event at the selected location. Thereafter, the employee notes the second periodically changing random code at the end of the event at the selected location. After leaving the selected location, the employee communicates both the beginning code and the ending code to the service location. The communicated code is decoded at the service location to determine the times corresponding to the beginning code and the ending code, and such times are logged.

11 Claims, 3 Drawing Sheets

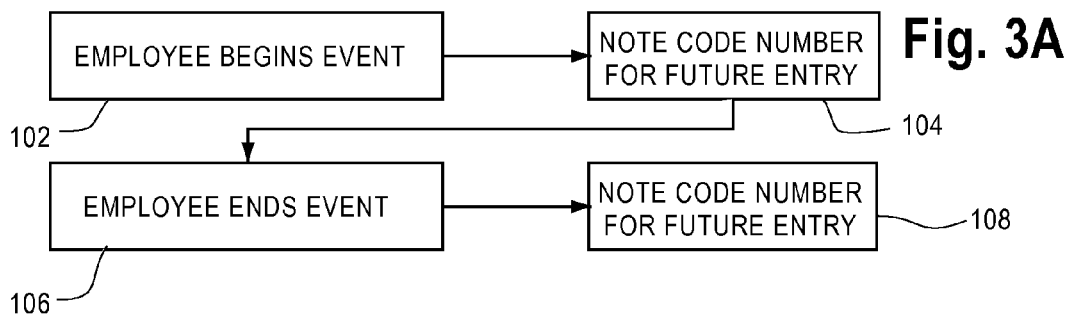
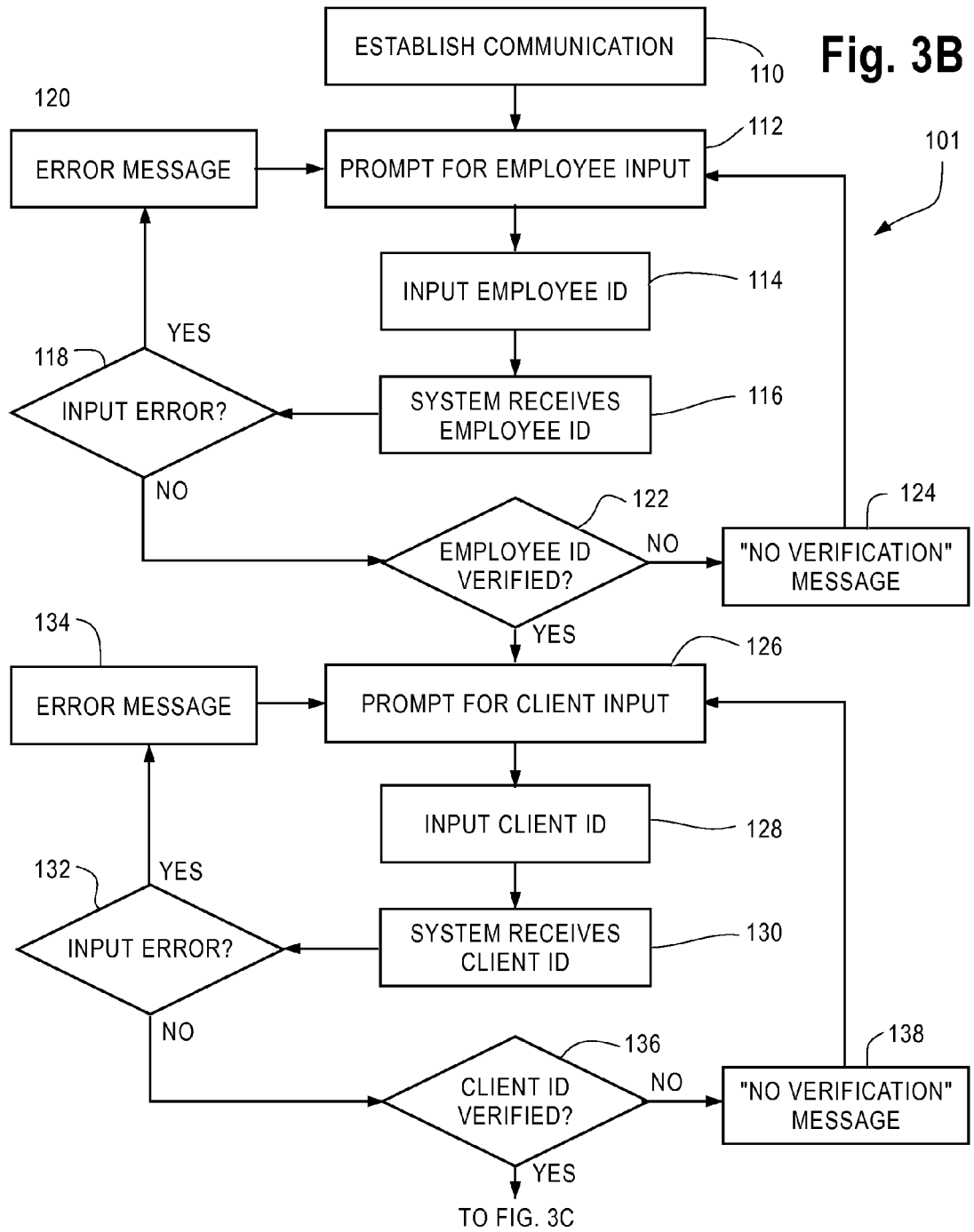

TIME AND/OR ATTENDANCE SYSTEM USING SYNCHRONIZED CODE

This application claims the benefit of provisional application Ser. No. 61/227,243 filed Jul. 21, 2009.

FIELD OF THE INVENTION

The present invention concerns a novel time and/or attendance system, and, more particularly, a novel computer-based system using synchronized code to verify the presence of a person at a particular time at a selected location or event.

BACKGROUND OF THE INVENTION

Systems are known for tracking persons, such as employees, by using computer-based telephone tracking and reporting systems. For this purpose, a computer-based tracking and reporting service may have a number of customers, each of which is a company with employees that provide services to a client. For example, the customer may be a nurses association, the employees of which are nurses who provide nursing services to a patient at the patient's home. In the parlance of the computer-based tracking service, the nurses association is the customer, the nurse is the "employee" or "caller", and the person receiving the service from the employee-caller is the "client". Tracking services are also useful for non-commercial applications. For instance, it can be used by prison systems to determine if a parolee has met with a parole officer.

Ordinarily the employee-caller is scheduled to provide services at the client's address at a specified date for a specified amount of time. The nurses association (i.e., the customer) may want to track the nurse's time of arrival, time of departure, etc. at the client's location in order to have a record of the nurse's activity and amount to be paid to the nurse for the nursing services and/or to the nurses association by a medical insurance company.

In one prior system, the employee calls a telephone number when the employee arrives at the client's location. When the call is received, the Dialed Number Identification Service (DNIS) is detected and the Automatic Number Identification (ANI) is also detected. The DNIS is compared with a customer database and the employee is requested to enter the appropriate data. The entered data, the DNIS, the ANI, and other information such as the time and date of the call is recorded and saved. However, on occasion the employee, caller, may enter the wrong caller identification, and the system will record an incorrect caller identification code and will be unable to determine the correct identification of the caller.

In another system, a computer-based system is provided for collecting data from callers, including a customer's database corresponding to a customer's Dialed Number Identification Service (DNIS) and in which system the caller has an identification code. When a call is received, the DNIS is detected and is compared with the customer's database to determine the data to collect during the call. If a caller identification code is required, then the caller identification code is obtained and the caller identification code is compared, via the computer, with a check digit algorithm without referencing a caller identification code database. After the call is terminated, a call record is created for the received call.

Now that cellular, or mobile phones are in wide use, however, it is difficult to determine the location of the employee through utilization of the previous methods. Accordingly, what is needed is a method and system, which can verify, regardless of the use of cellular technology, that the employee is at the proper location, at the proper time.

Further, many locations where the employee is expected to be do not have a telephone or contact device enabling the employee to make a call, or a computer enabling the employee to log in. Such locations, which are void of any contact device, including telephones and computers, do not enable data to be forwarded as to the location being visited. However, there is a need to verify that the employee has arrived at a selected location at a selected time and also to verify when the employee has left this selected location.

Other objects and advantages of the present invention will become apparent as the description proceeds. It is to be understood, however, that although the terms "telephone" or "telephonic" are used for convenience herein to refer to the medium upon which communication is achieved, these terms are intended to include cable transmission, satellite transmission, cellular transmission, Internet transmission, and any other type of transmission upon which communication can be achieved.

SUMMARY OF THE INVENTION

In accordance with the present invention, a method is provided for determining if an event has occurred. The method includes providing a device having a periodically changing code which is synchronized with a time clock associated with a service location. If the event occurs, the code is communicated to the service location. As used herein, the term "service location" includes a single location and also includes multiple locations. The communicated code is decoded to determine the time corresponding to the communicated code, to confirm the actual time of the occurrence of the event. In one embodiment, the device contains a random number table and is constructed in a tamper-proof package that will self destruct if anyone attempts to open or reverse engineer the random number table.

In an embodiment of the invention, the time and/or attendance method that is provided includes providing a periodically changing code at a selected location. The code is noted at the beginning of the event at the selected location. The code is noted at the end of the event at the selected location. A service location is provided at which the code is correlated with actual time. After leaving the selected location, both the beginning code and the ending code are communicated to the service location. The codes could be communicated within a short time after leaving the selected location or they could be communicated many weeks thereafter. In this manner, the present invention enables an employee to visit a location which is void of any contact device and still enable the verification that the employee has arrived at a selected location at a selected time and also to verify that the employee has left this selected location at a selected time. The communicated code is decoded to determine the times corresponding to the beginning code and the ending code. The time corresponding to the beginning code and the time corresponding to the ending code are logged.

In one embodiment of the present invention, the system comprises a service location having a server with a first periodically changing random code that is correlated with actual time. A device displaying a second periodically changing random code is located at a selected location. The second periodically changing random code has the same sequence as the first periodically changing random code but the code being displayed on the device is offset in time from the first periodically changing random code.

A more detailed explanation of the invention is provided in the following description and claims, and is illustrated in the accompanying drawings.

BRIEF DESCRIPTION OF THE DRAWINGS

FIGS. 3A, 3B and 3C, when taken together, comprise a functional block diagram depicting an exemplary operation of the system of FIG. 1.

DETAILED DESCRIPTION OF THE ILLUSTRATIVE EMBODIMENT

Figure 1:
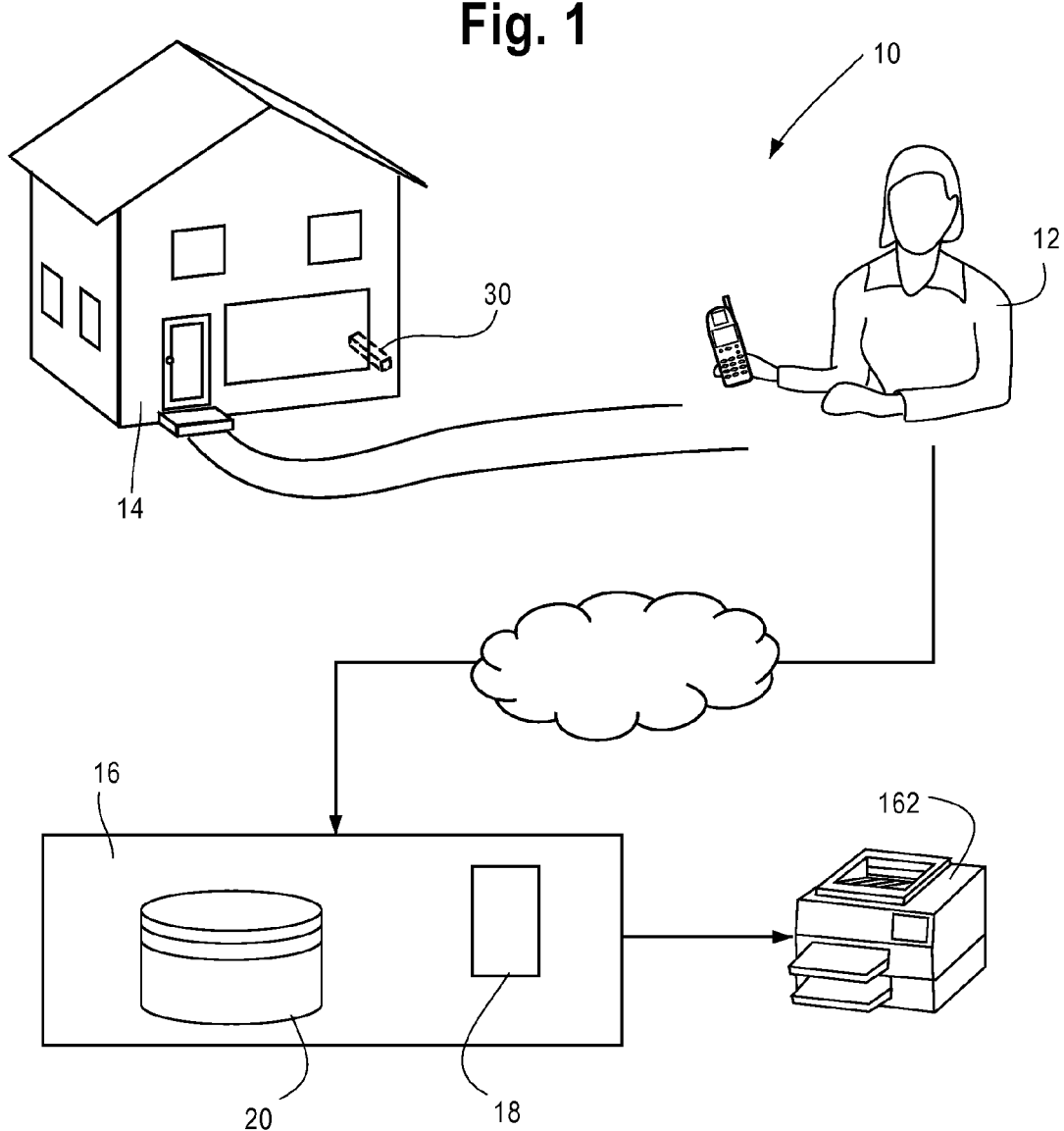
FIG. 1 is a diagram depicting one example of a time and/or attendance system in accordance with the principles of the present invention.

Referring to FIG. 1, there is shown an example of a time and/or attendance system 10 for verifying that an employee 12 was present at a selected location 14 at a particular date and time. System 10 includes a server 16 at a service location. Server 16, or whatever computing device is utilized. includes one or more logic components 18 such as computer software and/or hardware components to carry out the process shown in FIGS. 3A-3C. The process, which is performed on server 16, can be performed on another type of computing device or system. For example, the computing device could be a personal computer, a work station, a file server, a mainframe, a personal digital assistant, a mobile telephone, or combination of these devices. In the case of more than one computing device, the multiple computing devices could be coupled together through a network.

Server 16 in one example includes a database 20. The database 20 includes previous listed information regarding the identification of employees and clients. For instance, if the customer prefers that an employee verify his or her identity and the client's identity with numerical data from a telephone keypad, the database will include numerical identifiers and codes that corresponds to each employee and client. Similarly, if a customer prefers the use of voice verification technology, the database 20 will contain preexisting voice prints for each employee. If a customer prefers the use of biometric data, then the database 20 will contain data representative of a biometric characteristic. For simplification herein, all of these means of identification will usually be referred to as "ID".

Figure 2:
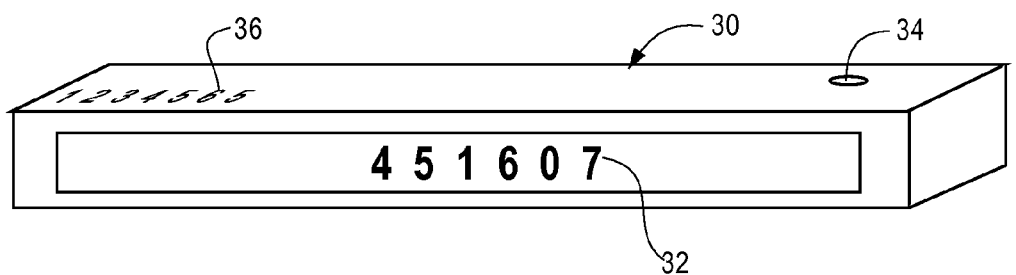
FIG. 2 is a diagram depicting an example of a device for displaying a random code, in accordance with the principles of the present invention.

Referring now to FIG. 2, a device 30 for displaying a code 32 is shown. The device can be anything that can display a unique code. For example, device 30 may be an electronic fob which carries a computer chip having stored therein a table of random numbers, as discussed below. Alternatively, the device 30 can receive the code via wireless transmission, for example via satellite, Internet Wi-Fi, etc. Device 30 can be a computer, a BlackBerry, an iPhone, a satellite TV channel, or any other device that displays the unique code. Device 30 could be a printer which prints a number on a document. Device 30 can be given passive or active transmission capabilities to allow the servicing agent to electrically obtain the unique code. Although no limitation is intended, in the preferred embodiment the device is a form of an electronic fob which uses a coded system to identify the exact day and minute of each year so that the customer can provide work time when the employee entered and left the client's premises. The fob remains in the possession of the client at all times and the client is required to maintain control of the fob.

The electronic fob 30 is a simple device that is programmed to count down each minute through a pre-established table of random numbers that was programmed into the fob during its manufacture. The fob is secure and made to destruct upon tampering. The fob 30 contains the same secret random number table that is recorded on the server 16 at the service location. It is neither possible nor necessary to have the remote fob 30 and a service location server 16 producing the same number at the same time. The key is that the remote fob 30 will be synchronized with a server 16 at the time of its delivery and remote activation at the client's location. In that manner, while the fob 30 contains the same secret random number table, and presents the code in the same sequence as the code stored in the server 16, the code on the fob 30 is offset in time from the code stored in the server 16.

The random number table of the server 16 will be synchronized with the time in minutes of actual time. The remote fob's different random number will, in turn, be synchronized to the server's random number table. Thus, upon synchronization, all of the remote fob's random numbers can be decoded into the actual time the service began and ended.

The fob 30 includes a simple count down timer, which in one embodiment, steps through a pre-programmed random number table once each minute. The fob is constructed in a tamper-proof package that will self-destruct and destroy the fob if anyone attempts to open or reverse-engineer the random number table. The fob 30 may have a display that is easily read by the employee, such as an LED readout.

The fob will also be constructed with a pushbutton 34, used to display the code. This serves two purposes: a) to prolong the fob's battery life and, b) to make it more cumbersome to attempt to manually decode the fob's numbering scheme. As an additional precaution, the fob is programmed to change its state (e.g. self destruct, display an error code, restart its countdown table, etc.) if it detects that someone is trying to compromise the system by attempting to decipher the code, such as by pushing the pushbutton 34 down repeatedly or by holding its pushbutton 34 down for more than a pre-determined time period (e.g. one hour).

The fob is engraved with an external serial number 36 that is recorded upon delivery to the client, together with the digits displayed on the fob at the time of activation process, to provide the initial synchronization process needed to coordinate the later time decoding process.

Since there are 525,600 minutes in a year, a simple 6-digit countdown time (000000-999999) can be used to display the required digits. In fact, this could allow up to 22.8 month of random numbers to be displayed before the table would need to repeat. Alpha digits or additional display digits could be added to extend the time and/or to enable the code to change more often than each minute.

In the server, the correlation of the table of random numbers to the actual time is logged or recorded, thereby enabling archival information for many years. The server has information as to what the offset is for each device that displays the code, thereby rendering the code on each device correlated to the server which is correlated to the actual time. This is particularly useful if one wishes to determine and validate the time and attendance of an employee at a client that occurred several years previously. This is significant because using a six digit countdown time which changes once per minute, after 22.8 months the random numbers would have to repeat, which is undesirable. If desired, once the random numbers are completed, an entirely new random number table is generated.

The server 16 is programmed to detect when the fob 30 is losing its battery power and the fob can periodically be automatically re-synchronized if the server 16 detects a slight shift in the accuracy of the calibration of the remote fob 30 to the pre-established server random number table. The servicing agency can then decide to replace the remote fob 30 and re-synchronize the remote fob to the server.

When the employee to perform the requested service enters or visits the premises, the employee examines the fob 30 and records the random code displayed when the services are initiated. Upon completing the service, the employee again records the random asynchronous code presented on the fob 30. The present invention uses an asynchronous process for verifying the employee's time and attendance. In this manner, the premises visited by the employee can be in a remote location where there is no means to contact a service location. The present invention allows the employee to communicate with the service location at any time after the employee has completed the service at the client's premises, even if the employee communicates at a much later date. Thus, upon completion of the employee's route or service activities site, the employee calls into a service location that has server 16 which can decode the random code and register the beginning and end of the employee's service segments. This call into the service location can occur weeks after the employee has actually visited the client's premises.

Referring now to FIG. 3A, the process shown is an example of a portion of the system of the present invention. In step 102, an employee begins an event such as a nurse visiting a client. The fob is located at the client's premises. In step 104, the employee makes a note of the fob code at the beginning of the event. In step 106, the employee has completed his or her visit to the client and the event has ended. In step 108, the employee makes a note of the fob code at the time the event has ended.

Figure 3C:
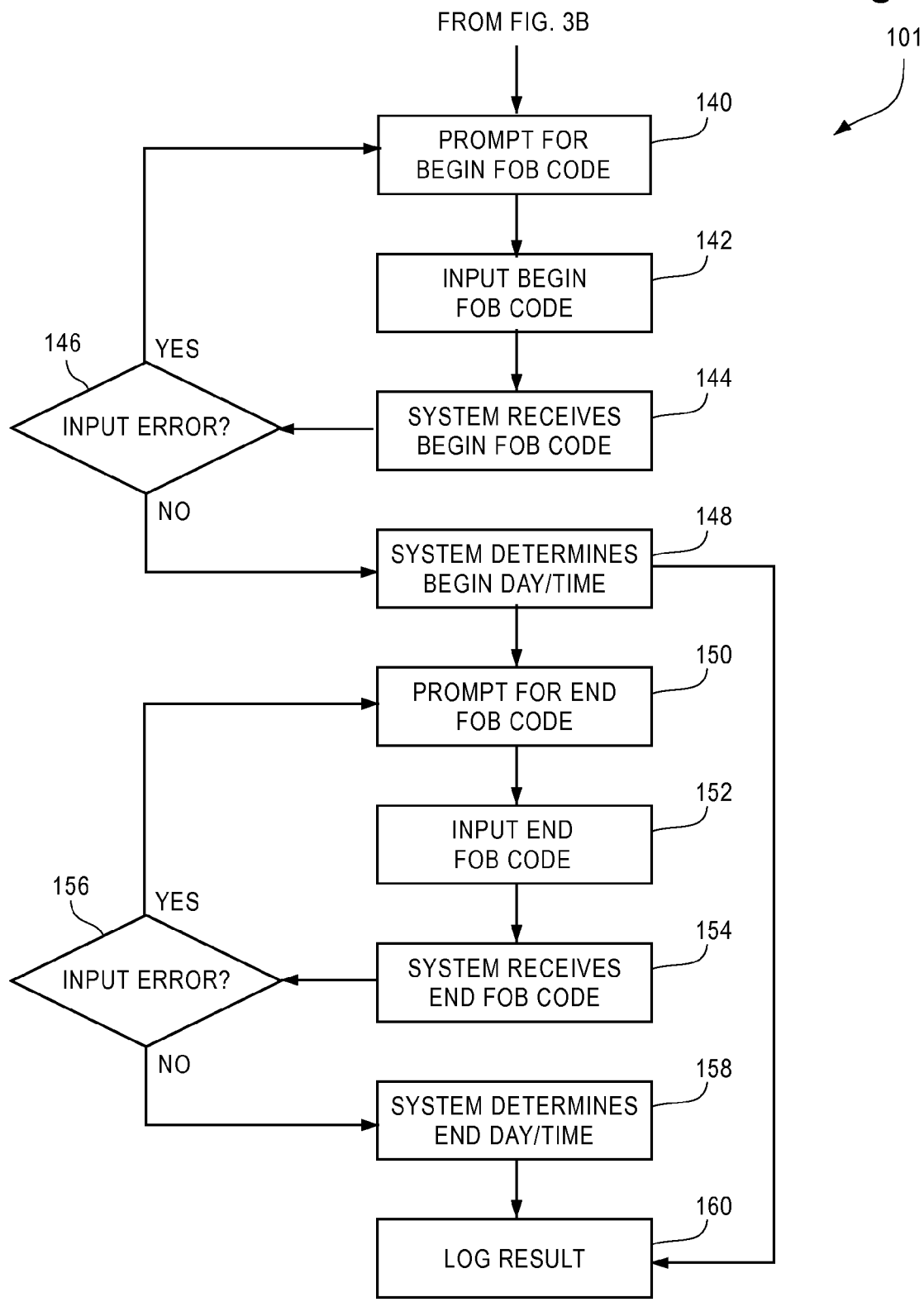

Referring to FIGS. 3B and 3C, another example process portion 101 of the system of the present invention is shown. Upon completing his or her services, the employee establishes communication with the service location, such as by line telephone, mobile telephone, personal digital assistant, etc. (Step 110). A prompt is transmitted from the service location, requesting the employee's ID (Step 112). In Step 114, the employee inputs his or her ID. In step 116, the system receives the employee's ID and then determines if there is an input error (step 118). If there is a input error, an error message is issued (step 120) and the employee is prompted again. If there no input error, a determination is made whether the employee ID is verified (step 122). If the employee ID is not verified, there is a "no verification" message (step 124) and the employee is prompted again for his or her ID.

If the employee ID is verified, the system prompts the employee for the ID number of the client (step 126). In step 128, the employee inputs the client's ID number and the system receives the client's ID (step 130). In step 132, a determination is made whether there is an input error. If there is an input error, there is an error message (step 134) and the employee is prompted to reenter the client's ID. If there is no input error, a determination is made in step 136 whether the client's ID is verified. If the client's ID is not verified, there is "no verification" message (step 138) and the employee is prompted again to input the client's ID. If the client's ID is verified 136, the next step 140 (FIG. 3C) is a prompt for the beginning fob code. In step 142, the employee enters the beginning fob code and in step 144, the system receives the beginning fob code. There is a determination whether there is an input error (step 146) and if there is an input error, there is a re-prompt for the beginning fob code. If there is no input error, the system determines the begin day and time based upon decoding the beginning fob code associated with the client's ID. Server 16 keeps track of the fobs that are located at each client's location and the code sequence and timing for each fob.

To provide an extra level of security each fob is registered by a serial number to a selected client's location. Any movement of that fob to a different location would indicate a security problem.

In step 150, the employee is prompted for the end fob code and the employee inputs the end fob code (step 152). The system receives the end fob code (step 154) and determines whether there is an input error of the end fob code (step 156). If there is an input error of the end fob code, the employee is again prompted for the end fob code. If there is no input error, the system determines the end day and time based on the end fob code compared with the client's ID (step 158). In step 160, the begin day and time and the end day and time for the employee visiting the client is logged on a printer 162 (see FIG. 1) or another output or readable device.

An additional application for the fob 30 is for time issues not related to visits, but event-based activities. As an example, if a patient needs to take a medication or measure his blood pressure several times a day, but it is impractical or not possible (no phone) to call in the readings, the patient writes down the number displayed on the fob 30 that coincides with the occurrence of the event. By writing down the number displayed on the fob 30, this information can either be called in at a later date or time or just left on paper to be verified at a later time. The fob 30 will provide a much more accurate approach to confirming the actual time of the event since the fob time is synchronized against the server and is not subject to patient's memory or revision. This event timing aspect would be applicable and useful in multiple settings (e.g. home, nursing home, hospital, school, etc.).

An additional application is in circumstances where one can not or does not choose to use a GPS-based system to confirm locations, stops along a route, etc. (e.g. bus routes, newspaper/mail/package deliveries, etc.). Rather than use a GPS, a fob is affixed at selected locations (e.g. bus stops, end of lines, etc.) and the driver simply records the number displayed on the fob at the selected stops. These readings are used after the fact to confirm the location of the designated party at the specifically recorded time.

An additional application includes circumstances such as a night watchman application, where one is seeking an inexpensive way to record the "rounds" of a circulating staff member (e.g. night watchman, nurse, etc.)

The present invention can be used in any situation where there is a need to provide verified time and attendance, such as nurses, occupational therapists, etc. who provide services to in-home patients, or it could be use to monitor educators who provide services to home-bound students.

The fob can be used worldwide to provide positive proof of when any repair/maintenance/service/cleaning individual has visited one's home to perform a service and how long he or she stayed.

The present invention has many advantages over the prior art. For example, it alleviates fraud significantly. Since the device is asynchronous and therefore does not require communication from the service location, the information displayed on device 30 can be communicated at a later time and place. This makes the present invention suitable for use on a remote mountain, a remote village or any location where communication is limited or non-existent. The code cannot be decoded other than by the appropriate server and the device displaying the code cannot be tampered with. A result of the present invention is that superior verification is achieved, potentially resulting in better healthcare to the client.

Although an illustrative embodiment of the invention has been shown and described, it is to be understood that various That which is claimed:

1. A time and/or attendance system which comprises:
a server having a first code table for providing a first code;
said first code table being a pre-established code table that is stored in the server;
a device having stored therein a second code table;
the second code table being the same pre-established code table that is stored in the server;
the device being adapted to display code provided by periodically stepping through the second code table stored therein;
the code provided by the first code table having the same sequence as the code provided by the second code table;
the code displayed on the device being offset in time from the first code stored in the server;
the server having information as to what the offset time difference is for the device that displays the code.

2. A time and/or attendance system as defined by claim 1, in which said first and second code tables comprise number tables.

3. A time and/or attendance system as defined by claim 2, in which said number tables comprise numbers in random order.

4. A time and/or attendance system as defined by claim 1, in which the code tables are preprogrammed non-sequential number tables and the device comprises a fob having a countdown timer which periodically steps through the preprogrammed non-sequential number table.

5. A time and/or attendance system as defined by claim 1, in which the first code table is synchronized with the second code table and is synchronized with the actual time.

6. A time and/or attendance system as defined by claim 1, in which the time period for stepping through the code provided by the second code table is one minute per step.

7. A time and/or attendance system as defined by claim 1, in which the device does not require communication from the server.

8. A time and/or attendance system as defined by claim 1, including a plurality of selected locations, each having a separate device located therein, each device having stored therein a code table that is the same code table that is stored in the server, each device being adapted to display code provided by periodically stepping through the code table stored therein, with the code displayed on each device being offset in time from the first code.

9. A time and/or attendance system which comprises:
a server having a first code table for providing a first code;
said first code table being a pre-established code table that is stored in the server;
a plurality of devices;
each device of said plurality of devices having stored therein a code table;
the code table stored in each device being the same pre-established code table that is stored in the server;
each device being adapted to display code provided by periodically stepping through the code table stored therein;
the code provided by the first code table having the same sequence as the code provided by the other code tables; and
the code displayed on each device being offset in time from the first code stored in the server;
the server having information as to what the offset time difference is for each device that displays the code.

10. A time and/or attendance system as defined by claim 9, in which each device does not require communication from the server.

11. A time and/or attendance system which comprises:
a service location;
the service location having a server having a first number table for providing a first code;
said first code table being a pre-established number table that is stored in the server;
a plurality of selected locations;
a device located at each selected location;
each device having stored therein a code table;
the code table stored in each device being the same pre-established code table that is stored in the server,
each device being adapted to display code provided by periodically stepping through the code table stored therein;
the code provided by the first code table having the same sequence as the code provided by the other code tables; and
the code displayed on each device being offset in time from the first code stored in the server;
the server having information as to what the offset time difference is for each device.

* * * * *